United States Patent
Lee et al.

(10) Patent No.: US 12,293,540 B2
(45) Date of Patent: May 6, 2025

(54) APPARATUS FOR CONSTRUCTING KINEMATIC INFORMATION OF ROBOT MANIPULATOR AND METHOD THEREFOR

(71) Applicant: KOREA INSTITUTE OF ROBOT AND CONVERGENCE, Pohang-si (KR)

(72) Inventors: Junyoung Lee, Pohang-si (KR); Maolin Jin, Pohang-si (KR); Sang Hyun Park, Pohang-si (KR); Bumgyu Kim, Pohang-si (KR)

(73) Assignee: KOREA INSTITUTE OF ROBOT AND CONVERGENCE, Pohang-si (KR)

( * ) Notice: Subject to any disclaimer, the term of this patent is extended or adjusted under 35 U.S.C. 154(b) by 231 days.

(21) Appl. No.: 17/388,522

(22) Filed: Jul. 29, 2021

(65) Prior Publication Data

US 2022/0383540 A1    Dec. 1, 2022

(30) Foreign Application Priority Data

May 26, 2021    (KR) ........................ 10-2021-0067628

(51) Int. Cl.
*G06T 7/73*    (2017.01)
*B25J 9/16*    (2006.01)
(Continued)

(52) U.S. Cl.
CPC .............. *G06T 7/73* (2017.01); *B25J 9/1697* (2013.01); *G06F 18/214* (2023.01);
(Continued)

(58) Field of Classification Search
CPC .......... B25J 9/1697; B25J 9/163; B25J 9/161; G06T 7/73; G06T 2207/20081;
(Continued)

(56) References Cited

U.S. PATENT DOCUMENTS 11,173,610 B2 * 11/2021 Gothoskar ............... B25J 9/163
2015/0266183 A1    9/2015 Alifragkis et al.
(Continued)

FOREIGN PATENT DOCUMENTS

CN    111260649 B  *  9/2020
CN    112419419 A     2/2021
(Continued)

OTHER PUBLICATIONS

Mieikis et al., "Transfer Learning for Unseen Robot Detection and Joint Estimation on a Multi-Objective Convolutional Neural Network," 2018, 2018 IEEE International Conference on Intelligence and Safety for Robotics (ISR), pp. 337-342 (Year: 2018).*

(Continued)

*Primary Examiner* — Emily C Terrell
*Assistant Examiner* — Julia Z. Yao
(74) *Attorney, Agent, or Firm* — Westman, Champlin & Koehler, P.A.; Amanda M. Prose (57) ABSTRACT

An apparatus for constructing kinematic information of a robot manipulator is provided. The apparatus includes: a robot image acquisition part for acquiring a robot image containing shape information and coordinate information of the robot manipulator; a feature detection part for detecting the type of each of a plurality of joints of the robot manipulator and the three-dimensional coordinates of the joint using a feature detection model generated through deep learning based on the robot image containing shape information and coordinate information; and a variable derivation part for deriving Denavit-Hartenberg (DH) parameters based on the type of each of the plurality of joints of the robot manipulator and the three-dimensional coordinates of the joint.

4 Claims, 9 Drawing Sheets

(51) Int. Cl.
*G06F 18/21* (2023.01)
*G06F 18/214* (2023.01)
*G06T 7/50* (2017.01)

(52) U.S. Cl.
CPC .............. *G06F 18/217* (2023.01); *G06T 7/50* (2017.01); *G06T 2207/20081* (2013.01)

(58) Field of Classification Search
CPC .......... G06T 7/50; G06V 10/40; G06V 10/82; G06F 18/217; G06F 18/214; G06F 18/241; G06F 18/2413; G06F 18/2415; G05B 2219/40527
See application file for complete search history.

(56) References Cited

U.S. PATENT DOCUMENTS

| | | | |
|---|---|---|---|
| 2020/0311855 A1* | 10/2020 | Tremblay | G06T 1/0014 |
| 2021/0023719 A1* | 1/2021 | Alt | B25J 9/1697 |

FOREIGN PATENT DOCUMENTS

| | | |
|---|---|---|
| JP | H09131681 A | 5/1997 |
| JP | 2017164838 A | 9/2017 |
| JP | 6235664 B2 | 11/2017 |
| KR | 10 2010 0105143 A | 9/2010 |
| KR | 10 1210499 B1 | 12/2012 |
| KR | 10-1278836 B1 | 7/2013 |
| KR | 10 2020 0065499 A | 6/2020 |

OTHER PUBLICATIONS

Zhou et al., "3D Pose Estimation of Robot Arm with RGB Images Based on Deep Learning", 2019, Intelligent Robotics and Applications, ICIRA 2019, pp. 541-553, Lecture Notes in Computer Science(), vol. 11743, Springer, Cham, https://doi.org/10.1007/978-3-030-27538-9_46 (Year: 2019).*

Mieikis et al., "Multi-Objective Convolutional Neural Networks for Robot Localisation and 3D Position Estimation in 2D Camera Images," 2018 15th International Conference on Ubiquitous Robots (UR), Honolulu, HI, USA, 2018, pp. 597-603, doi: 10.1109/URAI. 2018.8441813. (Year: 2018).*

Lepetit, "Recent Advances in 3D Object and Hand Pose Estimation," 2020, arXiv, in Computing Research Repository (CoRR), vol. abs/2006.05927 [online], [retrieved on Jun. 10, 2020]. (Year: 2020).*

Li et al. "RGB-D Image Processing Algorithm for Target Recognition and Pose Estimation of Visual Servo System." Sensors (Basel). Jan. 12, 2020;20(2):430. doi: 10.3390/s20020430. PMID: 31940895; PMCID: PMC7013466. (Year: 2020).*

Stepanova et al., "Automatic self-contained calibration of an industrial dual-arm robot with cameras using self-contact, planar constraints, and self-observation," 2020, arXiv, in Computing Research Repository (CoRR), vol. abs/2012.07548 [online], [retrieved on Dec. 14, 2020]. (Year: 2020).*

Agrawal, "Loss Functions and Optimization Algorithms. Demystified.," Medium [retrieved Sep. 29, 2017]. Retrieved from Internet <URL: https://medium.com/data-science-group-iitr/loss-functions-and-optimization-algorithms-demystified-bb92daff331c> (Year: 2017).*

Labbe et al., "Single-view robot pose and joint angle estimation via render & compare," arXiv, in Computing Research Repository (CoRR), 2021, vol. abs/2104.09359 [online]. [retrieved on Apr. 26, 2021]. Retrieved from the Internet <URL: https://arxiv.org/abs/2104. 09359> (Year: 2021).*

Lei et al., "Multi-stage 3D Pose Estimation Method of Robot Arm Based on RGB Image," 2021 7th International Conference on Control, Automation and Robotics (ICCAR), Singapore, 2021, pp. 84-88, doi: 10.1109/ICCAR52225.2021.9463454. (Year: 2021).*

Gulde et al., "RoPose: CNN-based 2D Pose Estimation of Industrial Robots," 2018 IEEE 14th International Conference on Automation Science and Engineering (CASE), Munich, Germany, 2018, pp. 463-470, doi: 10.1109/COASE.2018.8560564. (Year: 2018).*

Decision to Grant issued for KR patent application serial No. 10-2021-0067628 dated Sep. 26, 2022, with English machine translation.

* cited by examiner

APPARATUS FOR CONSTRUCTING KINEMATIC INFORMATION OF ROBOT MANIPULATOR AND METHOD THEREFOR

CROSS-REFERENCE TO RELATED APPLICATION

This application claims priority to Korean Patent Application No. 10-2021-0067628, filed on 26 May 2021, the disclosure of which is incorporated by reference herein in its entirety.

BACKGROUND OF THE DISCLOSURE

Field of the Disclosure

The present disclosure relates to a technology for constructing kinematic information of a robot manipulator, and more particularly to, an apparatus for constructing kinematic information of a robot manipulator from image information of the robot manipulator and a method therefor.

Related Art

While most of the robot manipulators in the past were PUMA-type robots that resemble the human arm and SCARA-type robots that work on planar surfaces, various types of robots have been emerging recently, along with the fourth industrial era, including dual arm robots, surgical robots, and medical and sports-assistive robots. Moreover, customized robot manipulators (customized robot arms) are manufactured for on-site work on a small-to-medium sized business scale—however, it is difficult to adapt them for use in actual situations due to a lack of expertise.

PRIOR ART DOCUMENT

[Patent Document]
(Patent Document 1) Korean Unexamined Patent No. 2010-0105143 (published on Sep. 29, 2010).

SUMMARY

The present disclosure provides an apparatus for constructing kinematic information of a robot manipulator from image information of the robot manipulator and a method therefor.

An exemplary embodiment of the present disclosure provides an apparatus for constructing kinematic information of a robot manipulator, the apparatus including: a robot image acquisition part for acquiring a robot image containing shape information and coordinate information of the robot manipulator; a feature detection part for detecting the type of each of a plurality of joints of the robot manipulator and the three-dimensional coordinates of the joint using a feature detection model generated through deep learning based on the robot image containing shape information and coordinate information; and a variable derivation part for deriving Denavit-Hartenberg (DH) parameters based on the type of each of the plurality of joints of the robot manipulator and the three-dimensional coordinates of the joint.

The feature detection part may feed the robot image containing shape information and coordinate information as input into the feature detection model generated through deep learning, and the feature detection model may produce a computed value for each of a plurality of joints of the robot manipulator included in the robot image, including the type of the joint and the three-dimensional coordinates of the joint, by performing operations using learned weights on the shape information and coordinate information of the robot image.

The variable derivation part may allocate a joint coordinate system to each of the plurality of joints according to the type of the joint and derive DH parameters based on the allocated joint coordinate system and the detected three-dimensional coordinates of the joint.

The apparatus may further include a model generation part which provides a labeled robot image for training that includes the type of each of the plurality of joints of the robot manipulator and the three-dimensional coordinates of the joint, which feeds the robot image for training as input into a feature detection model with initialized parameters, which, once the feature detection model with initialized parameters produces a computed value for each of the plurality of joints of the robot manipulator, including the type of the joint and the three-dimensional coordinates of the joint, by performing operations using weights initialized from the robot image for training, produces a loss representing the difference between the computed value and the label, and which performs optimization to modify the weights of the feature detection model so as to minimize the difference between the computed value and the label.

Another exemplary embodiment of the present disclosure provides a method for constructing kinematic information of a robot manipulator, the method including: acquiring, by a robot image acquisition part, a robot image containing shape information and coordinate information of the robot manipulator; detecting, by a feature detection part, the type of each of a plurality of joints of the robot manipulator and the three-dimensional coordinates of the joint using a feature detection model generated through deep learning based on the robot image containing shape information and coordinate information; and deriving, by a variable derivation part, Denavit-Hartenberg (DH) parameters based on the type of each of the plurality of joints of the robot manipulator and the three-dimensional coordinates of the joint.

The detecting of the type of each of a plurality of joints of the robot manipulator and the three-dimensional coordinates of the joint may include: feeding, by the feature detection part, the robot image containing shape information and coordinate information as input into the feature detection model generated through deep learning; and producing, by the feature detection model, a computed value for each of the plurality of joints of the robot manipulator included in the robot image, including the type of the joint and the three-dimensional coordinates of the joint, by performing operations using learned weights on the shape information and coordinate information of the robot image.

The deriving of Denavit-Hartenberg (DH) parameters based on the type of each of the plurality of joints of the robot manipulator and the three-dimensional coordinates of the joint may include: allocating, by the variable derivation part, a joint coordinate system to each of the plurality of joints according to the type of the joint; and deriving, by the variable derivation part, DH parameters based on the allocated joint coordinate system and the detected three-dimensional coordinates of the joint.

The method may further include: prior to the acquiring of a robot image containing shape information and coordinate information of the robot manipulator, providing, by a model generation part, a labeled robot image for training that includes the type of each of the plurality of joints of the robot manipulator and the three-dimensional coordinates of the joint; feeding, by the model generation part, the robot image for training as input into a feature detection model with initialized parameters; producing, by the feature detection model with initialized parameters, a computed value for each of the plurality of joints of the robot manipulator, including the type of the joint and the three-dimensional coordinates of the joint, by performing operations using weights initialized from the robot image for training; producing, by the model generation part, a loss representing the difference between the computed value and the label; and performing, by the model generation part, optimization to modify the weights of the feature detection model so as to minimize the difference between the computed value and the label.

According to the present disclosure, it is possible to make the analysis of direct kinematics, inverse kinematics, and kinetics easier by providing kinematic information of a robot manipulator derived from image information of the robot manipulator. Accordingly, the robot manipulator may be customized to fit actual on-site situations.

DESCRIPTION OF EXEMPLARY EMBODIMENTS

Prior to the detailed description of the present disclosure, the terms and words used in this specification and claims should not be construed as being limited to their ordinary or dictionary meanings, but should be interpreted as having meanings and concepts consistent with the technical ideas of the present disclosure based on the principle that the inventor may properly define the concepts of terms in order to describe their own disclosure in the best way possible. Therefore, the configurations shown in the exemplary embodiments and drawings described in this specification are merely the most preferred embodiments of the present disclosure and are not representative of the technical ideas of the present disclosure, so that it should be understood that various equivalents and modifications may be substituted for those at the time of filing of the present application.

Hereinafter, exemplary embodiments in the present disclosure will be described in detail with reference to the accompanying drawings. In the drawings, the same reference numerals will be used throughout to designate the same or like elements. Further, the detailed description of well-known functions and configurations that may obscure the gist of the present disclosure will be omitted. For the same reason, some of the components in the accompanying drawings may be exaggerated, omitted, or schematically illustrated, and the dimensions of respective components may not accurately reflect the actual sizes of the components.

Figure 1:
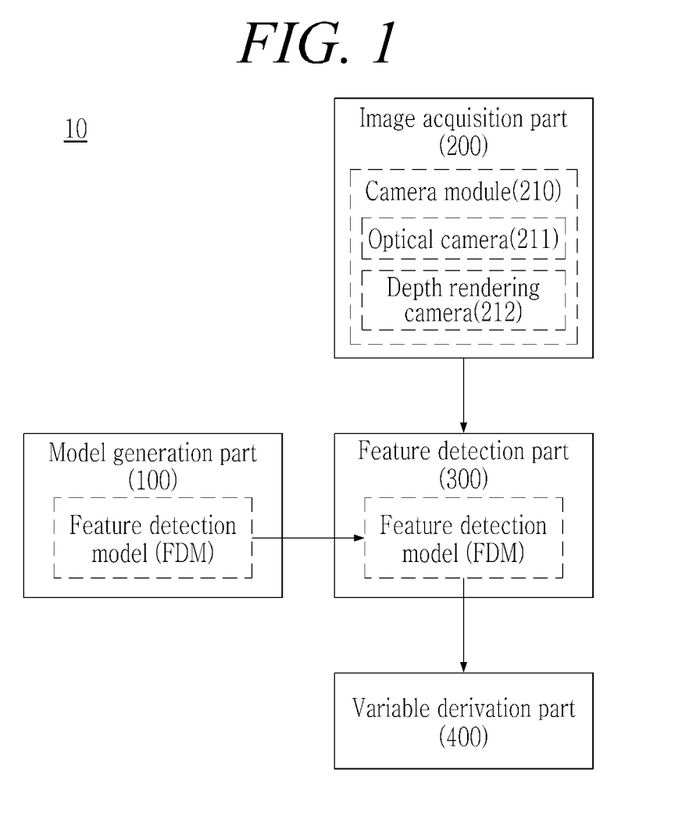
FIG. 1 is a view for explaining a configuration of an apparatus for constructing kinematic information of a robot manipulator according to an embodiment of the present disclosure.
Figure 2:
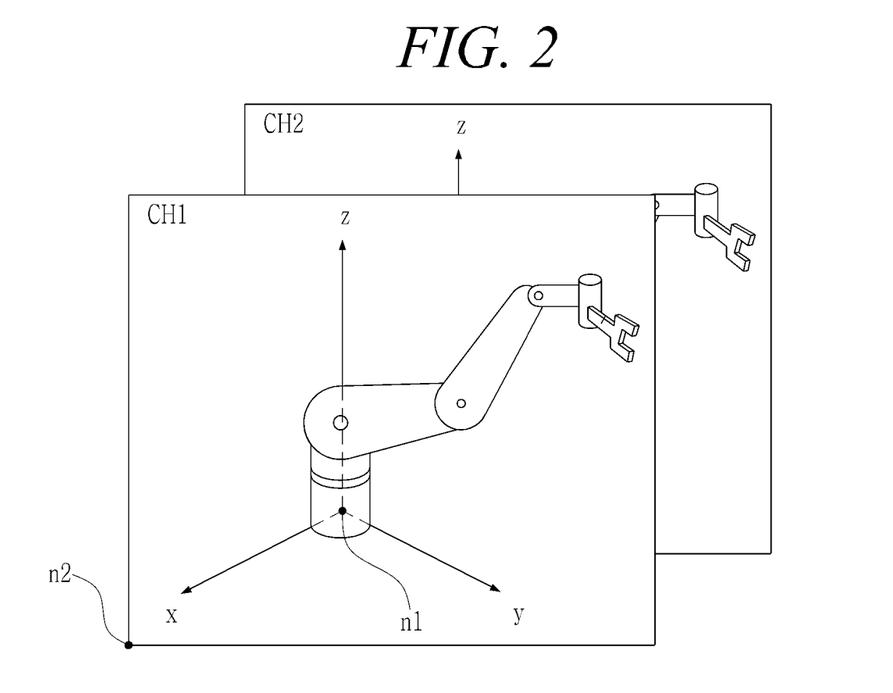
FIG. 2 is a view for explaining a robot image for constructing kinematic information of a robot manipulator according to an embodiment of the present disclosure.

First of all, a configuration of an apparatus for constructing kinematic information of a robot manipulator according to an embodiment of the present disclosure will be described. FIG. 1 is a view for explaining a configuration of an apparatus for constructing kinematic information of a robot manipulator according to an embodiment of the present disclosure. FIG. 2 is a view for explaining a robot image for constructing kinematic information of a robot manipulator according to an embodiment of the present disclosure.

Referring to FIG. 1, an apparatus 10 for constructing kinematic information of a robot manipulator according to an embodiment of the present disclosure (hereinafter, abbreviated as construction apparatus) includes a model generation part 100, an image acquisition part 200, a feature detection part 300, and a variable derivation part 400.

The model generation part 100 is used for generating a feature detection model FDM, which is a deep learning model according to an embodiment of the present disclosure, through deep learning. The model generation part 100 trains the feature detection model FDM using a robot image for training. Such a robot image for training has a label on it that includes the type of each of a plurality of joints of a robot manipulator and the three-dimensional coordinates of the joint. Accordingly, the model generation part 100 may generate a feature detection model FDM that calculates features of a robot manipulator—that is, the type of each of a plurality of joints and the three-dimensional coordinates of the joint—through deep learning using robot images for training. Such a learning method will be described in more detail below.

The image acquisition part 200 is used for acquiring a robot image containing the robot manipulator's shape information and coordinate information. That is, as depicted in FIG. 2, a robot image may be an image comprised of two channels: a channel representing shape information; and a channel representing coordinate information. Here, the type information represents the pixel value of each pixel of the robot image, and the coordinate information represents the three-dimensional coordinates of each pixel of the robot image.

According to an embodiment, the image acquisition part 200 may include a camera module 210, and may acquire a robot image using the camera module 210. The camera module 210 is used for capturing a robot image. The camera module 210 may include an optical camera 211 and a depth rendering camera 212. The optical camera 211 and the depth rendering camera 212 capture images in sync with each other. The optical camera 211 captures an optical image made up of a plurality of pixel values, and such an optical image constitutes shape information of the robot image. Such shape information may be provided as the pixel value of each pixel of the robot image, and may include three channels of (R, G, B). The depth rendering camera 212 may capture an image that provides depth coordinates (distance), that is, a depth image, and the camera module 210 may generate and provide a robot image containing coordinate information based on the depth coordinates (distance) from the depth rendering camera 212. The camera module 210 acquires internal parameters of the optical camera 211, such as resolution, i.e., the number of pixels in height and width in an optical image captured by the optical camera 211, synchronized with a depth image captured by the depth rendering camera 212, angle of view, and focal length. The camera module 210 then calculates the direction angle of each pixel in the optical image captured by the optical camera 211 with respect to the optical axis of the optical camera 211, and calculates coordinate information of each pixel in the optical image by using the calculated direction angle of each pixel in the optical image and the depth coordinates (distance) of the depth image captured by the depth rendering camera 212. Such coordinate information may be three-dimensional coordinates with respect to the focal point of the optical camera 211.

According to another embodiment, the image acquisition part 200 may extract a robot image from a design file, without using the camera module 210. The design file contains information such as the shape and dimensions of the robot manipulator, and the image acquisition part 200 may generate shape information from the design file by converting the format of the design file and generate coordinate information by deriving coordinates from the dimensions, thereby constructing a robot image.

The feature detection part 300 is used for detecting the type of each of a plurality of joints of the robot manipulator and the three-dimensional coordinates of the joint from the robot image. The feature detection part 300 receives a robot image containing shape information and coordinate information, and detects the type of each of a plurality of joints of the robot manipulator and the three-dimensional coordinates of the joint based on the robot image.

The variable derivation part 400 is used for configuring Denavit-Hartenberg (DH) parameters based on the type of each of the plurality of joints and the three-dimensional coordinates of the joint which are detected by the feature detection part 300.

Figure 3:
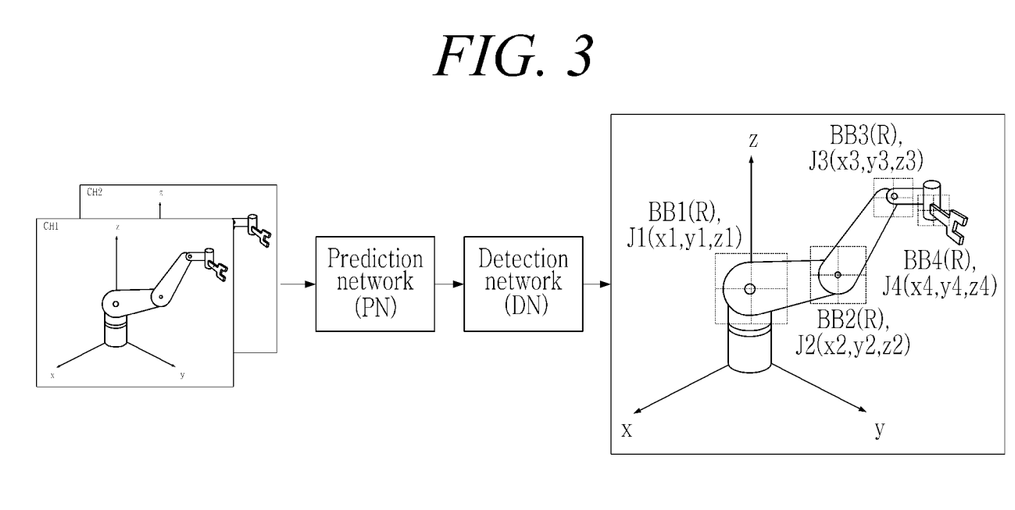
FIG. 3 is a view for explaining a configuration of a feature detection model trained to detect features of a robot manipulator according to an embodiment of the present disclosure.
Figure 4:
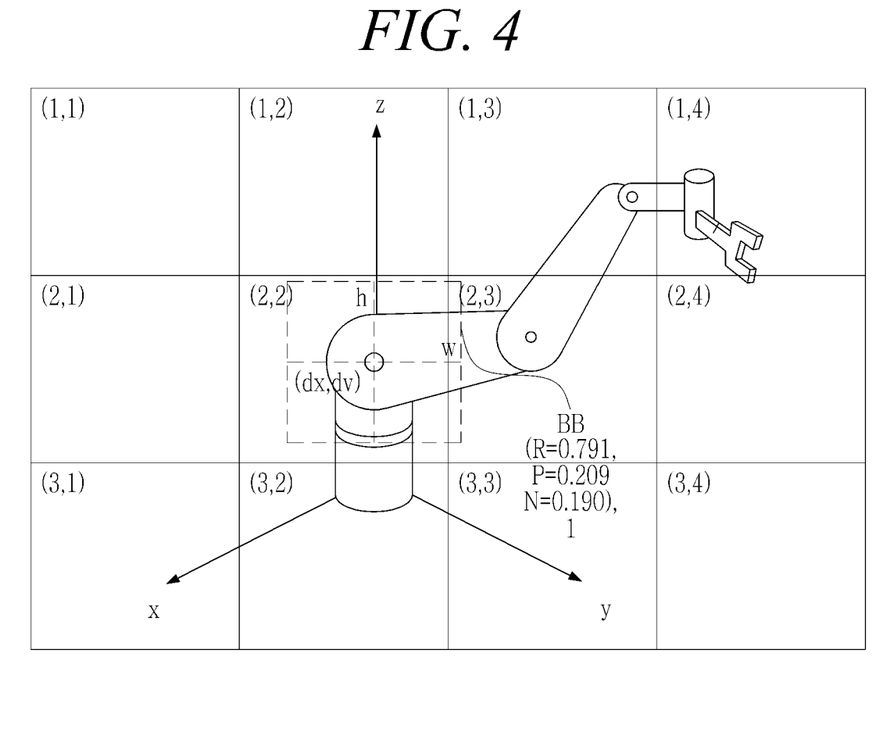
FIG. 4 is a view for explaining an operation method for a feature detection model trained to detect features of a robot manipulator according to an embodiment of the present disclosure.

Now, the above-described feature detection model trained through deep learning so as to detect features of the robot manipulator will be described in more details. FIG. 3 is a view for explaining a construction of a feature detection model trained to detect features of a robot manipulator according to an embodiment of the present disclosure. FIG. 4 is a view for explaining an operation method for a feature detection model trained to detect features of a robot manipulator according to an embodiment of the present disclosure.

Referring to FIG. 3, the feature detection model FDM includes one or two or more neural networks including one or two or more layers. Any one layer of the feature detection model FDM performs one or more operations. Notably, the feature detection model FDM includes a plurality of layers, and the plurality of layers includes a plurality of operations. Also, the plurality of layers are linked with weights w. A computational result of a layer is weighted and serves as the input to the next layer. That is, a layer of the feature detection model FDM receives a weighted value from the previous layer, performs an operation on the weighted value, and passes the computational result as the input to the next layer. In other words, the feature detection model FDM performs a plurality of operations using weights. The plurality of layers may include a convolution layer CL which performs a convolution operation and an operation using an activation function, a pooling layer PL which performs a downsampling operation or an upsampling operation, and a deconvolution layer DL which performs a deconvolution operation and an operation using an activation function.

The convolution, downsampling and upsampling, and deconvolution operations use a kernel made up of a given matrix, and the values of the elements of the matrix constituting the kernel are used as weights (w). Also, examples of the activation function may include Sigmoid, hyperbolic tangent (tanh), exponential linear unit (ELU), rectified linear unit (ReLU), leaky ReLU, Maxout, Minout, Softmax, etc.

The feature detection model FDM includes a prediction network PN, a detection network DN, and a merge module MM.

Once a robot image is fed as input, the prediction network PN outputs a predicted value by performing a plurality of operations using the weights of a plurality of layers. That is, the prediction network PN may output a predicted value by dividing a robot image into a plurality of cells and then calculating the center coordinates (dx, dy) of each of a plurality of bounding boxes BB relative to the cell where that bounding box BB belongs, the coordinates (dx, dy, w, h) of the bounding box defining the width (w) and height (h) relative to the center coordinates (dx, dy), the confidence which indicates how likely the object is contained in that bounding box BB and how likely the object is present inside that bounding box BB, and the probability that the object inside that bounding box BB belongs to each of a plurality of classes, i.e., a revolute joint (R) class, a prismatic joint (P) class, etc. An example of the predicted value is depicted in FIG. 4. As depicted in the drawing, the prediction network PN divides a robot image into a plurality of cells (1, 1) to (3, 4) and detects a plurality of bounding boxes from the plurality of cells (1, 1) to (3, 4). Taking an example from one of the detected bounding boxes, the bounding box BB of the cell (2, 2) has a confidence of 1, the probability that the object inside the bounding box BB is a revolute joint (R) is 79% (0.791), the probability that the object inside the bounding box BB is a prismatic joint (P) is 1% (0.019), and the probability that the object inside the bounding box BB does not belong to any of the classes is 19% (0.190).

The detection network DN selects at least one of the plurality of bounding boxes corresponding to the predicted value and outputs it as a computed value. The detection network DN may produce the computed value by performing a plurality of operations using weights on the predicted value. For example, the detection network DN may output, as the computed value, a bounding box where the probability of the object in the plurality of bounding boxes belonging to a learned class is equal to or greater than a set threshold and the three-dimensional coordinates [(xi, yi, zi), i=1, 2, 3, . . . ] corresponding to the center coordinates (dx, dy) of that bounding box. For example, assuming that the threshold is 75%, the probability that an object within a bounding box BB of FIG. 4 is a revolute joint (R) is 79% (0.791). Thus, the detection network DN may output, as the computed value, the bounding box BB and the three-dimensional coordinates [(xi, yi, zi), i=1, 2, 3, . . . ] corresponding to the center coordinates (dx, dy) of that bounding box.

Figure 5:
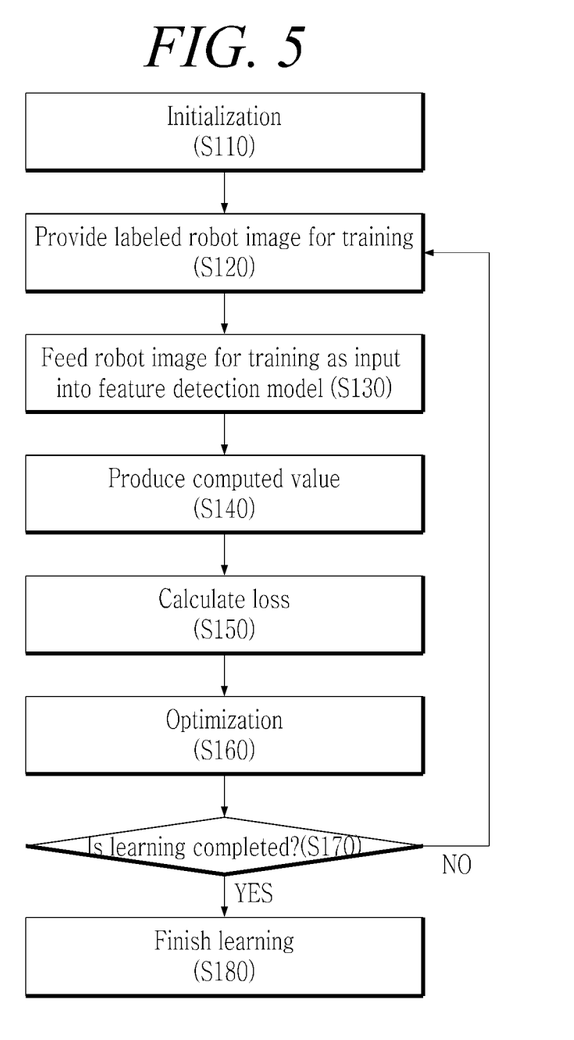
FIG. 5 is a flowchart for explaining a method for generating a feature detection model FDM according to an embodiment of the present disclosure.
Figure 6:
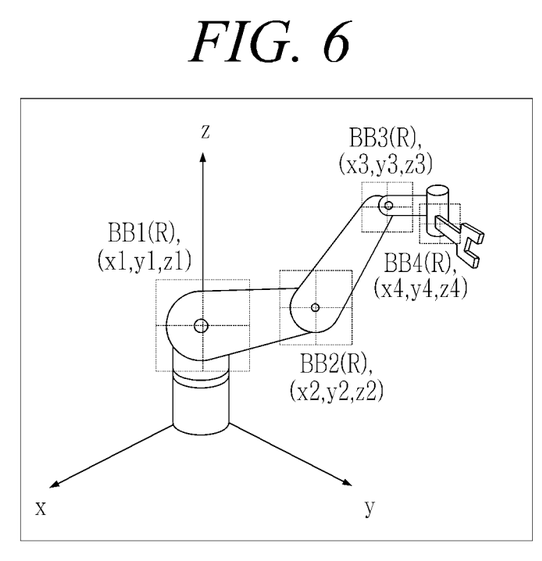
FIG. 6 is a view for explaining a label assigned to a robot image that is used to train a feature detection model according to an embodiment of the present disclosure.

Next, a method for generating a feature detection model FDM according to an embodiment of the present disclosure will be described. FIG. 5 is a flowchart for explaining a method for generating a feature detection model FDM according to an embodiment of the present disclosure. FIG. 6 is a view for explaining a label assigned to a robot image that are used to train a feature detection model according to an embodiment of the present disclosure.

Referring to FIG. 5, the model generation part 100 initializes the feature detection model FDM in the step S110. Such initialization means initializing the parameters, i.e., weights w, of the feature detection model FDM. Once initialization is completed, the model generation part 100 provides a labeled robot image for training to the initialized feature detection model FDM in the step S120. That is, as depicted in FIG. 6, the model generation part 100 provide a labeled robot image for training that includes a ground-truth bounding box BB for each of a plurality of joints of a robot manipulator, the type (R or P) of the joint, and the three-dimensional coordinates [(xi, yi, zi), i=1, 2, 3, 4] of the joint. More specifically, the model generation part 100 provides a robot image for training which has a first channel labeled with a ground-truth bounding box BB indicating the actual area each of the plurality of joints of the robot manipulator occupies in the robot image and the class of each of the plurality of joints, e.g., a revolute joint (R) class and a prismatic joint (P) class, and a second channel labeled with three-dimensional coordinates mapped to the center (dx, dy) of the ground-truth bounding box BB. Particularly, as depicted in FIG. 6, the center coordinates (dx, dy) and width (w) and height (h) of the ground-truth bounding box BB may be indicated with an actual line (or dotted line).

Next, the model generation part 100 feeds the robot image as input into the feature detection model FDM in the step S130. Then, the feature detection model FDM produces a computed value by performing a plurality of operations using weights on the robot image in the step S140. Here, the computed value includes a bounding box BB containing a class to be learned, for example, a revolute (R) class and a prismatic (P) class, and three-dimensional coordinates mapped to the center (dx, dy) of that bounding box BB.

Subsequently, the model generation part 100 calculates a loss representing the difference between the computed value and the label by using a loss function in the step S150. Here, the loss includes a shape loss and a spatial coordinate loss. The model generation part 100 may obtain the shape loss by using the loss function in the following Equation 1.

$$\omega_{coord} \sum_{i=0}^{s^2} \sum_{j=0}^{B} 1_{ij}^{obj} \left[(dx_i - \hat{dx}_i)^2 + (dy_i - \hat{dy}_i)^2\right] +$$

$$\omega_{coord} \sum_{i=0}^{s^2} \sum_{j=0}^{B} 1_{ij}^{obj} \left[(\sqrt{w_i} - \sqrt{\hat{w}_i})^2 + (\sqrt{h_i} - \sqrt{\hat{h}_i})^2\right] +$$

$$\sum_{i=0}^{s^2} \sum_{j=0}^{B} 1_{ij}^{obj} (C_i - \hat{C}_i)^2 + \omega_{coord} \sum_{i=0}^{s^2} \sum_{j=0}^{B} 1_{ij}^{noobj} (C_i - \hat{C}_i)^2 +$$

$$\sum_{i=0}^{s^2} 1_{i}^{obj} \sum_{c \in classes} (p_i(c) - \hat{p}_i(c))^2$$

[Equation 1]

where S represents the number of cells, and B represents the number of bounding boxes in a cell. dx and dy represent the center coordinates of a bounding box, and w and h represent the width and height of the bounding box. C represents confidence score. Pi(c) represents the probability of an object in an ith cell belonging to a corresponding class (c). Here, i is an index representing a cell where an object is present, and j is an index representing a predicted bounding box. $\omega_{coord}$ is used to reflect a higher value for a variable of the bounding box, which is a parameter for balancing loss and other losses with the coordinates (dx, dy, w, h) of the bounding box. $\omega_{noobj}$ is used to reflect a higher value for a variable of the bounding box and a lower value for a variable of an area where the object is not present. That is, $\omega_{noobj}$ is a parameter for balancing between bounding boxes with or without objects. $1_i^{obj}$ represents that the object is in a cell. $1_{ij}^{obj}$ represents the jth bounding box is in cell i.

The first and second terms of Equation 1 are used to calculate a coordinate loss representing the difference between the coordinates (x, y, w, h) of a bonding box and the coordinates of an area where an object of a class to be learned is present. Also, the third term of Equation 1 is used to calculate a confidence loss representing the difference between the area of the bounding box B and a ground-truth box which is 100% likely to contain the object. Lastly, the last term of Equation 1 is used to calculate a classification loss representing the difference between the class of the object in the bounding box B and the actual class of the object.

Moreover, the model generation part 100 may obtain the spatial coordinate loss by the loss function of the following Equation 2.

$$\sum_{i=0}^{s^2} \sum_{j=0}^{B} 1_{ij}^{obj} \left[(x_i - \hat{x}_i)^2 + (y_i - \hat{y}_i)^2 + (z_i - \hat{z}_i)^2\right]$$

[Equation 2]

wherein x, y, and z represent three-dimensional coordinates corresponding to the center coordinates (dx, dy) of the bounding box. The other parameters in Equation 2 are the same as in Equation 1.

Next, the model generation part 100 performs optimization to modify the weights of the feature detection model FDM including the prediction network PN and the detection network DN so as to minimize every loss derived through the loss function in the step S160. That is, the model generation part 100 performs optimization to modify the weights of the feature detection model FDM so as to minimize the shape loss including the coordinate loss, confidence loss, and classification loss derived through the loss function of Equation 1 and the spatial coordinate loss derived through the loss function of Equation 2.

In the above-described steps S120 to S160, the weights (w) of the feature detection model FDM are repeatedly updated by using a plurality of different robot images CH1 and CH2 for training or a batch of a plurality of different robot images CH1 and CH2 for training. Such repetition occurs until the three losses, that is, the shape loss, the spatial coordinate loss, and the total loss including the shape loss and the spatial coordinate loss, are at or below a preset target value. Accordingly, the model generation part 100 determines whether the three losses, that is, the shape loss, the spatial coordinate loss, and the total loss including the shape loss and the spatial coordinate loss, are at or below a preset target value in the step S170, and if the shape loss, the spatial coordinate loss, and the total loss are at or below the preset target value, finishes learning in the step S180.

Figure 7:
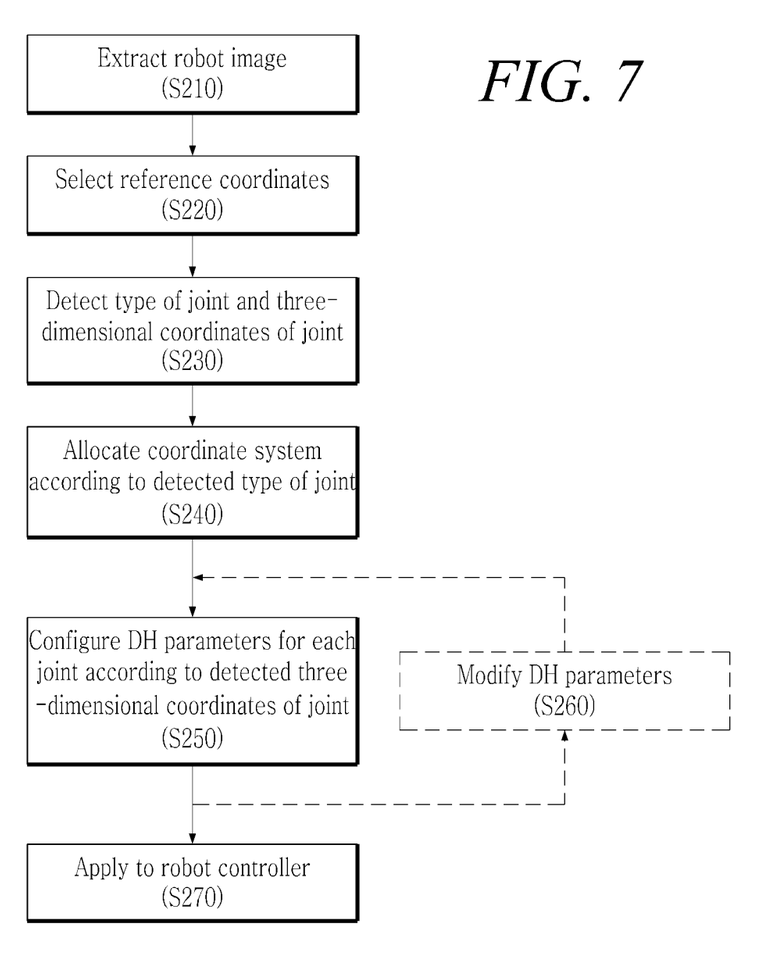
FIG. 7 is a flowchart for explaining a method for constructing kinematic information of a robot manipulator according to an embodiment of the present disclosure.
Figure 8:
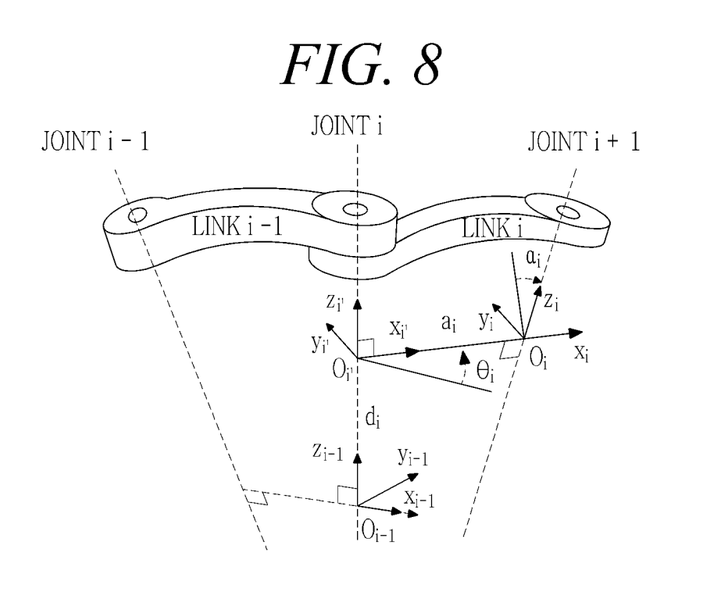
FIG. 8 is a view for explaining a method for constructing kinematic information of a robot manipulator according to an embodiment of the present disclosure.

Next, a method for constructing kinematic information of a robot manipulator according to an embodiment of the present disclosure will be described. FIG. 7 is a flowchart for explaining a method for constructing kinematic information of a robot manipulator according to an embodiment of the present disclosure. FIG. 8 is a view for explaining a method for constructing kinematic information of a robot manipulator according to an embodiment of the present disclosure.

Referring to FIG. 7, the image acquisition part 200 acquires a robot image containing shape information and coordinate information of a robot manipulator in the step S210. According to an embodiment, the image acquisition part 200 may include a camera module 210, and may acquire a robot image using the camera module 210. According to another embodiment, the image acquisition part 200 may extract a robot image from a design file, without using the camera module 210. The extracted robot image is fed as input into the feature detection part 300.

At this time, the feature detection part 300 may set reference coordinates in the robot image in the step S220. According to an embodiment, reference coordinates (n1) [0, 0, 0] may be set in response to a user input, as depicted in FIG. 2. According to another embodiment, a pixel at one corner of the robot image may be set as reference coordinates (n2).

Next, the feature detection part 300 detects the type of each of a plurality of joints of the robot manipulator and the three-dimensional coordinates of the joint by using a feature detection model generated through deep learning based on the robot image containing the shape information and the coordinate information in the step S230. More specifically, in the step S230, once the feature detection part 300 feeds the robot image containing the shape information and the coordinate information as input into the feature detection model generated through deep learning, the feature detection model FDM produces a computed value for each of a plurality of joints of the robot manipulator included in the robot image, including the type of the joint and the three-dimensional coordinates of the joint, by performing operations using learned weights on the shape information and coordinate information of the robot image.

Next, the variable derivation part 400 allocates a joint coordinate system to each of the plurality of joints according to the type of the joint with the computed value in the step S240. The variable derivation part 400 then derives DH parameters, i.e., a(i), d(i), α(i), and θ(i), according to the DH notation based on the allocated joint coordinate system and the detected three-dimensional coordinates of the joint in the step S250. Here, the variable inside the parentheses is a subscript. The variable derivation part 400 may find out the joint coordinate system and the detected three-dimensional coordinates of the joint and therefore obtain the distance and angle as required based on the joint coordinate system and the detected three-dimensional coordinates of the joint.

For example, as depicted in FIG. 8, the variable derivation part 400 may configure the DH parameters a(i), d(i), α(i), and θ(i). Here, a(i) is the distance between 0(i) and 0(i'), which represents the shortest distance between Joint i and Joint (i+1) relative to Axis x(i). d(i) is the distance between x(i−1) and x(i') along z(i−1), which represents the location of 0(i'). α(i) is the angle (angle of torsion) between z(i−1) and z(i) relative to x(i), which represents a positive value for counterclockwise rotation. θ(i) is the angle between x(i−1) and x(i) relative to z(i−1), which represents a positive value for counterclockwise rotation.

Meanwhile, since the derived DH parameters may have error, the feature detection part 300 may optionally perform DH parameter modification and robot kinematic calibration in response to user input, by using a detailed specification of the designed robot manipulator in the step S260.

The variable derivation part 400 feeds the above derived DH parameters, i.e., a(i), d(i), α(i), and θ(i), as input into a robot controller in the step S270.

According to the present disclosure described above, a user of a robot manipulator is able to easily get kinematic information of various types of manipulators, even without expert knowledge. Moreover, the user is able to extract and modify DH parameters required for precise control of the manipulator. These DH parameters may be applied to robot controllers and make the analysis of direct kinematics, inverse kinematics, and kinetics easier. Therefore, users involved in developing general manufacturing equipment in the field of manufacturing are also able to design a desired type of robot manipulator and easily customize it to actual on-site situations without expert knowledge.

Figure 9:
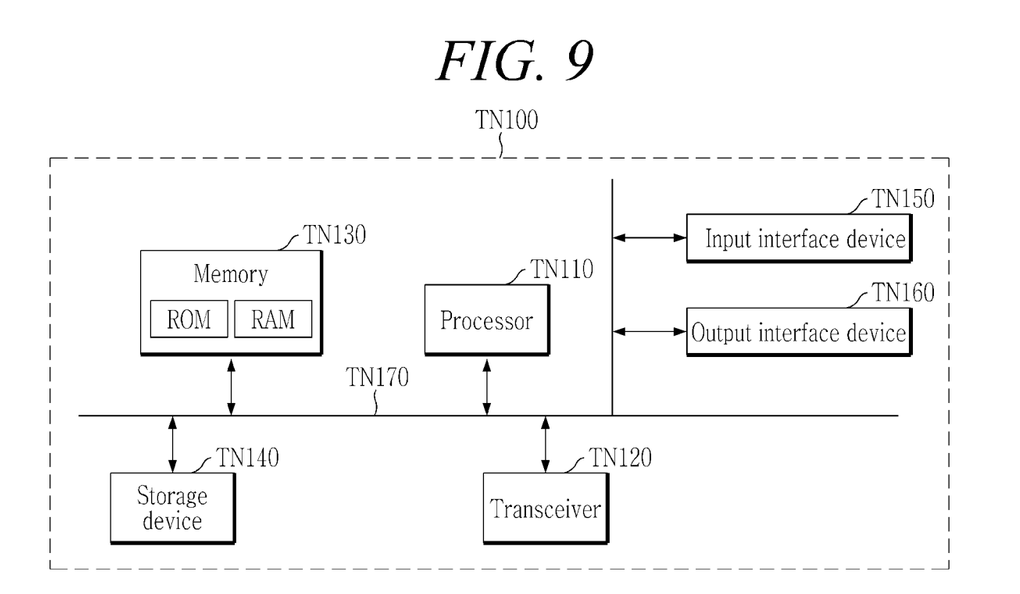
FIG. 9 is a view showing a computing device according to an embodiment of the present disclosure.

FIG. 9 is a view showing a computing device according to an embodiment of the present disclosure. The computing device TN100 of FIG. 9 may be an apparatus described in this specification, for example, the construction apparatus 10.

In the embodiment of FIG. 9, the computing device TN100 may include at least one processor TN110, a transceiver TN120, and a memory TN130. Also, the computing device TN100 may further include a storage device TN140, an input interface device TN150, and an output interface device TN160. The components included in the computing device TN100 may be connected by a bus TN170 to communicate with each other.

The processor TN100 may execute program commands stored in at least one of the memory TN130 and the storage device TN140. The processor TN110 may refer to a central processing unit (CPU), a graphics processing unit (GPU), or a dedicated processor on which methods according to exemplary embodiments of the present disclosure are performed. The processor TN110 may be configured to implement the procedures, functions, methods, etc. described in connection with an exemplary embodiment of the present disclosure. The processor TN110 may control each component of the computing device TN100.

Each of the memory TN130 and the storage device TN140 may store various information related to the operation of the processor TN110. Each of the memory TN130 and the storage device TN140 may be composed of at least one of a volatile storage medium and a nonvolatile storage medium. For example, the memory TN130 may be composed of at least one of a read only memory (ROM) and a random access memory (RAM).

The transceiver TN120 may transmit or receive a wired signal or a wireless signal. The transceiver TN120 may be connected to a network to perform communication.

Meanwhile, various methods according to an exemplary embodiment described above may be implemented in the form of a readable program through various computer means to be recorded in a computer-readable recording medium. Here, the recording medium may include program commands, data files, data structures, etc. alone or in combination. The program commands recorded on the recording medium may be those specially designed and configured for an exemplary embodiment or may also be known and available to those skilled in the art of computer software. For example, the recording medium may include magnetic media such as a hard disk, a floppy disk, and a magnetic tape, optical media such as CD-ROM and DVD, magneto-optical media such as a floptical disk, and hardware devices, such as ROM, RAM, and flash memory, that are specially configured to store and execute the program commands. Examples of the program commands may include a high-level programming language that may be executed by a computer using an interpreter as well as a machine language code made by a compiler. Such a hardware device may be configured to operate as one or more software modules in order to perform an operation of the present disclosure, and vice versa.

Although the present disclosure has been described with reference to several exemplary embodiments, these embodiments are merely illustrative and should not be considered as limiting. As such, it will be understood by those skilled in the art that various changes and modifications may be made by the doctrine of equivalents without departing from the spirit of the present disclosure and the scope of rights presented in the claims.

What is claimed is:

1. An apparatus for constructing kinematic information of a robot manipulator, the apparatus comprising:
   a robot image acquisition part for acquiring a composite robot image containing shape information and three-dimensional coordinate information of the robot manipulator;
   a processor comprising a feature detection part configured for detecting the type of each of a plurality of joints of the robot manipulator and the three-dimensional coordinates of the joint using a feature detection model generated through deep learning based on the composite robot image containing shape information and three-dimensional coordinate information;
   the processor comprising a variable derivation part configured for deriving Denavit-Hartenberg (DH) parameters based on the type of each of the plurality of joints of the robot manipulator and the three-dimensional coordinates of the joint; and
   wherein the processor feeds the composite robot image containing shape information and three-dimensional coordinate information as input into the feature detection model generated through deep learning, and the feature detection model produces a computed value for each of a plurality of joints of the robot manipulator included in the composite robot image, including the type of the joint and the three-dimensional coordinates of the joint, by performing operations using learned weights on the shape information and three-dimensional coordinate information of the composite robot image,
   wherein the feature detection part is configured to perform Denavit-Hartenberg (DH) parameter modification and robot kinematic calibration in response to a user input, by using a detailed specification of the robot manipulator; and
   wherein the processor further comprises a model generation part which provides a labeled composite robot image for training that includes the type of each of the plurality of joints of the robot manipulator and the three-dimensional coordinates of the joint, which feeds the composite robot image for training as input into a feature detection model with initialized parameters, which, once the feature detection model with initialized parameters produces a computed value for each of the plurality of joints of the robot manipulator, including the type of the joint and the three-dimensional coordinates of the joint, by performing operations using weights initialized from the composite robot image for training, produces a loss representing the difference between the computed value and a label, and which performs optimization to modify the weights of the feature detection model so as to minimize the difference between the computed value and the label, and wherein the model generation part obtains a shape loss by using a loss function according to Equation 1:

$$\omega_{coord} \sum_{i=0}^{s^2} \sum_{j=0}^{B} 1_{ij}^{obj} \left[ (dx_i - \hat{dx_i})^2 + (dy_i - \hat{dy_i})^2 \right] + \quad \text{[Equation 1]}$$

$$\omega_{coord} \sum_{i=0}^{s^2} \sum_{j=0}^{B} 1_{ij}^{obj} \left[ (\sqrt{w_i} - \sqrt{\hat{w_i}})^2 + (\sqrt{h_i} - \sqrt{\hat{h_i}})^2 \right] +$$

$$\sum_{i=0}^{s^2} \sum_{j=0}^{B} 1_{ij}^{obj} (C_i - \hat{C_i})^2 + \omega_{coord} \sum_{i=0}^{s^2} \sum_{j=0}^{B} 1_{ij}^{noobj} (C_i - \hat{C_i})^2 +$$

$$\sum_{i=0}^{s^2} 1_i^{obj} \sum_{c \in classes} (p_i(c) - \hat{p}_i(c))^2$$

wherein S represents the number of cells,
B represents the number of bounding boxes in a cell,
dx and dy represent center coordinates of a bounding box, and
w and h represent width and height of the bounding box,
C represents confidence score,
$p_i(c)$ represents the probability of an object in an ith cell belonging to a corresponding class (c), wherein i is an index representing a cell where an object is present, and j is an index representing a predicted bounding box,
$\omega_{coord}$ is used to reflect a higher value for a variable of the bounding box, which is a parameter for balancing loss and other losses with the coordinates (dx, dy, w, h) of the bounding box,
$\omega_{noobj}$ is used to reflect a higher value for a variable of the bounding box and a lower value for a variable of an area where the object is not present such that $\omega_{noobj}$ is a parameter for balancing between bounding boxes with or without objects,
$1_i^{obj}$ represents that the object is in a cell and $1_{ij}^{obj}$ represents the jth bounding box is in cell i,
wherein $1_{ij}^{noobj}$ is a complement of $1_{ij}^{obj}$ and $1_{ij}^{noobj}$ represents the jth bounding box is in cell i, where there is no object,
wherein $dx_i$, $dv_i$, $w_i$, $h_i$, $C_i$, and $p_i(c)$ with a ^ represent the value computed by the feature detection model:
and the model generation part obtains spatial coordinate loss by a loss function according to Equation 2;

$$\sum_{i=0}^{s^2} \sum_{j=0}^{B} 1_{ij}^{obj} \left[ (x_i - \hat{x}_i)^2 + (y_i - \hat{y}_i)^2 + (z_i - \hat{z}_i)^2 \right] \quad \text{[Equation 2]}$$

wherein x, y, and z represent three-dimensional coordinates corresponding to the center coordinates (dx, dy) of the bounding box, wherein x, y, and z with a ^ represent the value computed by the feature detection model, and the other parameters in Equation 2 are the same as in Equation 1.

2. The apparatus of claim 1, wherein the variable derivation part of the processor allocates a joint coordinate system to each of the plurality of joints according to the type of the joint and derives DH parameters based on the allocated joint coordinate system and the detected three-dimensional coordinates of the joint.

3. A method for constructing kinematic information of a robot manipulator, the method comprising:

acquiring, by a robot image acquisition part, a composite robot image containing shape information and three-dimensional coordinate information of the robot manipulator;

detecting, by a processor configured to carry out feature detection, the type of each of a plurality of joints of the robot manipulator and the three-dimensional coordinates of the joint using a feature detection model generated through deep learning based on the composite robot image containing shape information and three-dimensional coordinate information; and deriving, by the processor, which is configured to carry out variable derivation, Denavit-Hartenberg (DH) parameters based on the type of each of the plurality of joints of the robot manipulator and the three-dimensional coordinates of the joint, wherein the detecting of the type of each of a plurality of joints of the robot manipulator and the three-dimensional coordinates of the joint comprises:

feeding, by the processor configured to carry out the feature detection, the composite robot image containing shape information and three-dimensional coordinate information as input into the feature detection model generated through deep learning;

producing, by the feature detection model, a computed value for each of the plurality of joints of the robot manipulator included in the composite robot image, including the type of the joint and the three-dimensional coordinates of the joint, by performing operations using learned weights on the shape information and three-dimensional coordinate information of the composite robot image;

modifying, by the feature detection part, one or more Denavit-Hartenberg (DH) parameters and calibrating robot kinematic information in response to a user input using a detailed specification of the designed robot manipulator;

prior to the acquiring of a composite robot image containing shape information and three-dimensional coordinate information of the robot manipulator, providing, by the processor which is configured to carry out model generation, a labeled composite robot image for training that includes the type of each of the plurality of joints of the robot manipulator and the three-dimensional coordinates of the joint;

feeding, by the processor configured to carry out model generation, the composite robot image for training as input into a feature detection model with initialized parameters;

producing, by the feature detection model with initialized parameters, a computed value for each of the plurality of joints of the robot manipulator, including the type of the joint and the three-dimensional coordinates of the joint, by performing operations using weights initialized from the composite robot image for training;

producing, by the processor configured to carry out model generation, a loss representing the difference between the computed value and a label; and performing, by the processor configured to carry out model generation, optimization to modify the weights of the feature detection model so as to minimize the difference between the computed value and the label, and wherein the model generation part obtains a shape loss by using a loss function according to Equation 1:

$$\omega_{coord}\sum_{i=0}^{s^2}\sum_{j=0}^{B}1_{ij}^{obj}\left[(dx_i-\hat{dx_i})^2+(dy_i-\hat{dy_i})^2\right]+ \quad \text{[Equation 1]}$$

$$\omega_{coord}\sum_{i=0}^{s^2}\sum_{j=0}^{B}1_{ij}^{obj}\left[(\sqrt{w_i}-\sqrt{\hat{w_i}})^2+(\sqrt{h_i}-\sqrt{\hat{h_i}})^2\right]+$$

$$\sum_{i=0}^{s^2}\sum_{j=0}^{B}1_{ij}^{obj}(C_i-\hat{C_i})^2+\omega_{coord}\sum_{i=0}^{s^2}\sum_{j=0}^{B}1_{ij}^{noobj}(C_i-\hat{C_i})^2+$$

$$\sum_{i=0}^{s^2}1_i^{obj}\sum_{c\in classes}(p_i(c)-\hat{p}_i(c))^2$$

wherein S represents the number of cells,

B represents the number of bounding boxes in a cell, dx and dy represent center coordinates of a bounding box, and w and h represent width and height of the bounding box, C represents confidence score, $p_i(c)$ represents the probability of an object in an ith cell belonging to a corresponding class (c), wherein i is an index representing a cell where an object is present, and j is an index representing a predicted bounding box, $\omega_{coord}$ is used to reflect a higher value for a variable of the bounding box, which is a parameter for balancing loss and other losses with the coordinates (dx, dy, w, h) of the bounding box, $\omega_{noobj}$ is used to reflect a higher value for a variable of the bounding box and a lower value for a variable of an area where the object is not present such that $\omega_{noobj}$ is a parameter for balancing between bounding boxes with or without objects, $1_i^{obj}$ represents that the object is in a cell and $1_{ij}^{obj}$ represents the jth bounding box is in cell i, wherein $1_{ij}^{noobj}$ is a complement of $1_{ij}^{obj}$ and $1_{ij}^{noobj}$ represents the jth bounding box is in cell i, where there is no object, wherein $dx_i$, $dv_i$, $w_i$, $h_i$, $C_i$, and $p_i(c)$ with a ˆ represent the value computed by the feature detection model:

and the model generation part obtains spatial coordinate loss by a loss function according to Equation 2;

$$\sum_{i=0}^{s^2}\sum_{j=0}^{B}1_{ij}^{obj}\left[(x_i-\hat{x}_i)^2+(y_i-\hat{y}_i)^2+(z_i-\hat{z}_i)^2\right] \quad \text{[Equation 2]}$$

wherein x, y, and z represent three-dimensional coordinates corresponding to the center coordinates (dx, dy) of the bounding box, wherein x, y, and z with a ˆ represent the value computed by the feature detection model, and the other parameters in Equation 2 are the same as in Equation 1.

4. The method of claim 3, wherein the deriving of Denavit-Hartenberg (DH) parameters based on the type of each of the plurality of joints of the robot manipulator and the three-dimensional coordinates of the joint comprises:

allocating, by the processor configured to carry out variable derivation, a joint coordinate system to each of the plurality of joints according to the type of the joint; and deriving, by the processor configured to carry out variable derivation, DH parameters based on the allocated joint coordinate system and the detected three-dimensional coordinates of the joint.

* * * * *